Aug. 21, 1923.
R. M. MONTGOMERY
SEAT
Filed April 14, 1922
1,465,859
2 Sheets-Sheet 1
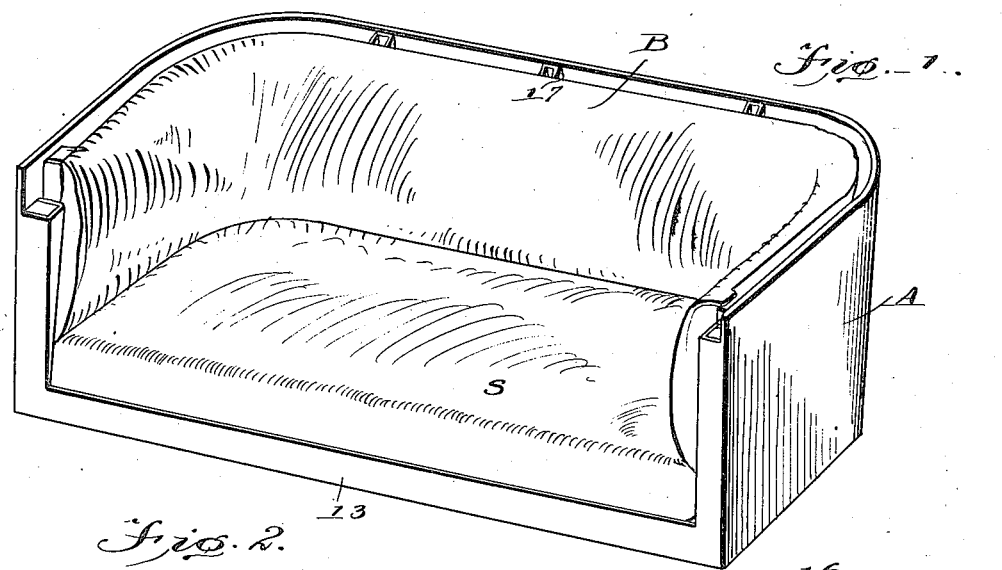
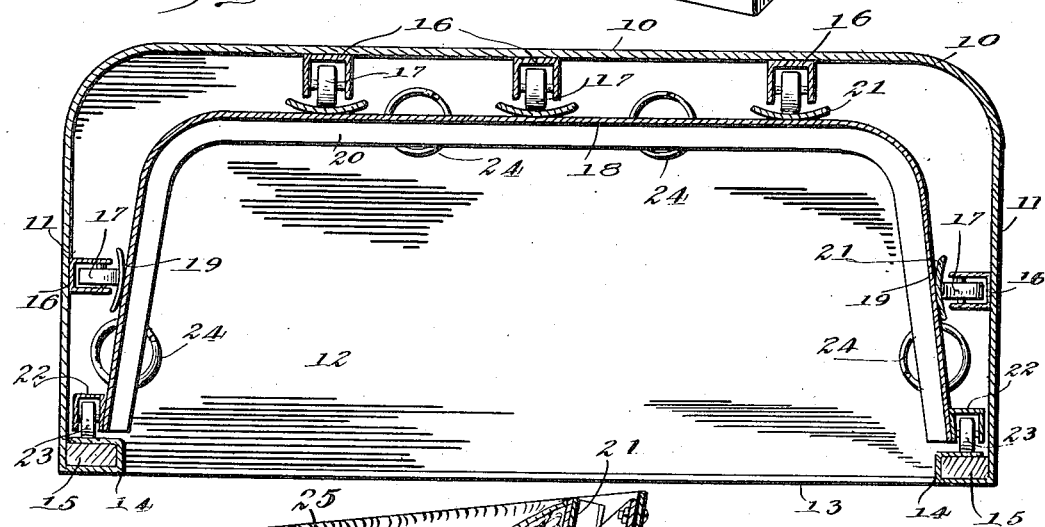
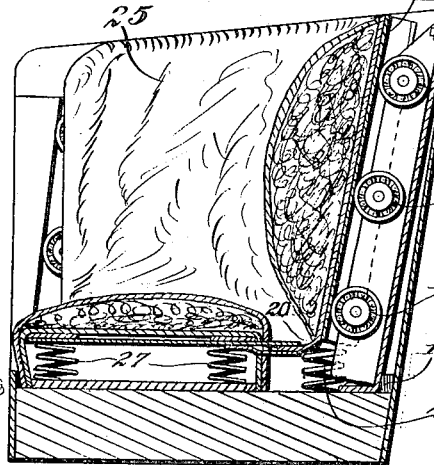
WITNESSES
INVENTOR
R. M. Montgomery,
BY
ATTORNEYS Aug. 21, 1923.
R. M. MONTGOMERY
SEAT
Filed April 14, 1922
1,465,859
2 Sheets-Sheet 2
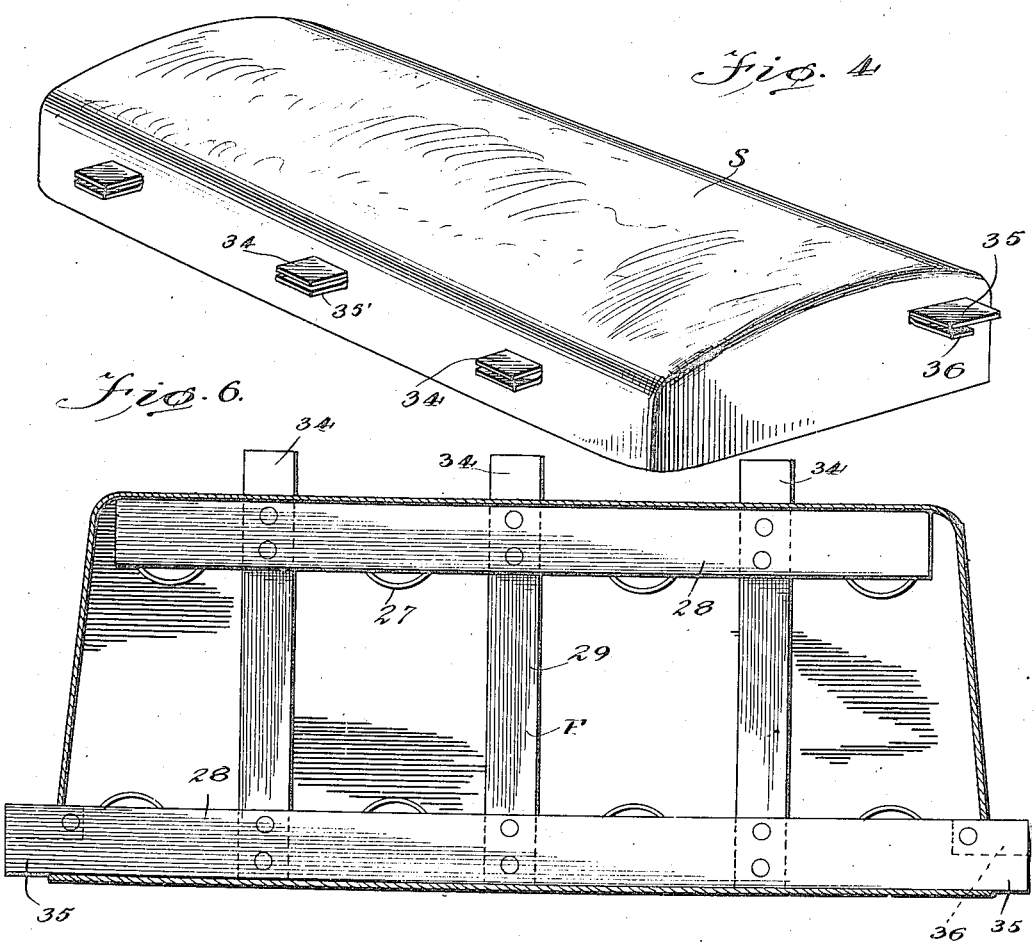
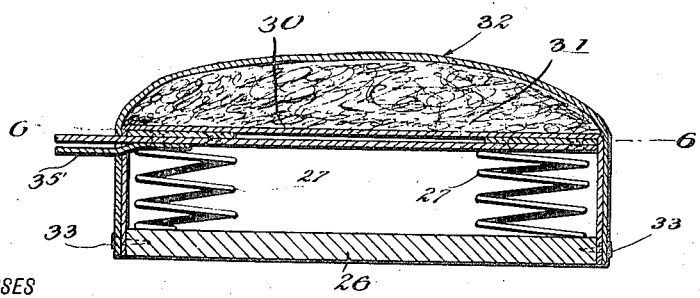

Patented Aug. 21, 1923.

1,465,859

UNITED STATES PATENT OFFICE.

ROBERT MITCHEL MONTGOMERY, OF PONTIAC, MICHIGAN.

SEAT.

Application filed April 14, 1922. Serial No. 552,676.

*To all whom it may concern:*

Be it known that I, ROBERT M. MONTGOMERY, a citizen of the United States, and a resident of Pontiac, in the county of Oakland and State of Michigan, have invented certain new and useful Improvements in Seats, of which the following is a specification.

This invention relates to a seat and more particularly to a seat structure for vehicles or the like.

The invention particularly relates to improvements over my Patent No. 1,406,059, bearing the date of Feb. 7, 1922; and has for its object to provide a seat of the character specified, in which all shocks to which the vehicle associated with the seat may be subjected is absorbed, and thus at all times insure the comfort of the occupant thereof.

In carrying out the invention it is contemplated to employ a seat structure comprising three units, the same being a seat boxing or housing, a seat back, and the seat. The back is spring supported and adapted for free vertical movement and enclosed within the seat housing. The seat is supported by the back and also supported by supplemental springs to further absorb shocks to which the seat may be subjected.

The invention is illustrated by way of example in the accompanying drawings, in which:—

Figure 1 is a perspective view of a seat construction of the present invention.

Figure 2 is a horizontal sectional view taken through the seat boxing or housing with the seat back positioned therein, and taken at a point immediately below the termination of the upholstering of the seat back.

Figure 3 is a transverse sectional view of the seat structure when fully assembled, as shown in Figure 1.

Figure 4 is a perspective view of the seat unit.

Figure 5 is a transverse sectional view of the same.

Figure 6 is a horizontal sectional view taken substantially on the lines 6—6 of Figure 5.

Referring to the drawings more particularly, A indicates generally the seat boxing or housing, B the seat back, and S the seat.

More particularly the seat housing or boxing A consists in a metal body structure preferably of the shape shown and comprising the rear wall 10, the two side walls 11, and the bottom 12. Also there should be provided along the forward edge of the bottom 12 an upwardly extending flange 13. Each free end of the side walls 11 is bent upon itself to form a casing 14 within which there is positioned a filler or core 15. The purpose of this construction will later become apparent.

Upon the inner side of the rear wall 11 of the seat housing there is secured a plurality of channel members 16, each channel member being spaced at its lower end from the wall 10 by a strip 16' in order that the channel members will be properly inclined. Also each side wall has secured upon its inner side a channel member 16 as shown. Within each channel member of both the side walls and also of the rear wall there is rotatably mounted a plurality of rollers 17, said rollers, in each instance, being arranged in spaced relation longitudinally of the associated channel member 16 and preferably of the roller bearing type, as shown.

The back B more particularly consists in a sheet metal body consisting of the back 18 and sides 19 which are formed substantially similar to the same portions of the seat housing A, and along the lower edge of the sheet metal body there extends inwardly a flange 20 to provide a ledge for seating the seat unit S in a manner which will later be described. Upon the rear face of the wall 18 of the seat back B there is secured a concave shaped strip 21 for each of the set of rollers 17, and a similar strip is secured to each side wall for the associated set of rollers 17.

Also adjacent the outer end of each side wall 19 there is secured a channel member 22 and disposed in the manner shown. Each channel member 22 rotatably supports a plurality of rollers 23 which are of the ball bearing type and which engage with the casing 14 and form a stop against forward movement of the seat back B. The seat back B is supported by a plurality of coil springs 24 which rest upon the bottom 12 of the seat housing A. The forward face of the seat back may have positioned thereon suitable upholstering generally indicated at 25.

The seat S consists in a base plate 26 upon which there is supported a frame F through the means of the springs 27. The frame F consists in the two longitudinals 28 and the cross members 29; and the springs 27 preferably engage beneath the longitudinals 28. A suitable flexible covering 30 may extend over the frame F and have its sides and ends secured to the base plate 26 as shown. Upon the cover 30 there may be positioned suitable stuffing 31 and the stuffing may in turn be covered by leather or the like as at 32. The leather covering 32 should extend downwardly about the sides and ends of the seat and have its lower edge secured to the base plate 26 as at 33.

Each cross member 29 of said frame F has its one side extended as at 34 and secured to this extended portion is a spring finger 35′ which is in spaced relation with the extended portion 34. Also the forward longitudinal frame member 28 has its ends extended as at 35 and likewise has associated therewith a spring finger 36.

When assembling the present seat structure, the seat housing or boxing A may be mounted in the vehicle in any desirable manner and then the seat back B may be positioned. This seat back is freely removable from the seat boxing. After the seat back has been positioned then the seat S may be placed in position and the projections 34 of the cross members brought to engage upon the ledge 20 and likewise the projections 35 of the longitudinal frame member 28. The spring finger 35′ associated with the extensions 34 and likewise the spring fingers 36 associated with the extension 35 aid to hold the seat S in position. The seat as is apparent is freely removable as a unit.

The springs 24 in the arrangement of seat structure described support the seat back B and also the seat S. The seat S is further supported by what may be termed supplemental springs 27. Upon the vehicle being subjected to a shock the back B is free to move upward and downward under the action of its supporting springs 24 and the seat S will be carried therewith. In case the shock is excessive the springs 27 of the seat S further absorb the same and it is believed that from this arrangement it may be obvious that I have provided a seat structure which will eliminate any possibility of shock to the occupant thereof.

While I have shown and described the preferred form of my invention, I wish it to be understood that I am aware of the fact that the construction, combination and arrangement of parts may be changed by those skilled in the art without departing from the spirit of the invention, as indicated by the appended claim.

I claim:

In a structure of the character described, a seat boxing, a seat structure within the seat boxing, spring for supporting said seat structure for upward and downward movement, said seat boxing consisting in sheet metal and having a portion at each end thereof turned upon itself to provide an elongated casing extending at right angles, in each instance, to the associated side of the seat boxing, a reinforcing member in each of said casings, and roller means carried by each associated end of the seat structure adapted to engage upon the inner walls of the casing and provide a stop to hold the seat structure against forward tilting movement.

ROBERT MITCHEL MONTGOMERY.